United States Patent [19]

Tahara et al.

[11] Patent Number: 5,703,859

[45] Date of Patent: Dec. 30, 1997

[54] DIGITAL VIDEO COPY PROTECTION SYSTEM

[75] Inventors: Katsumi Tahara; Hideki Koyanagi; Yoichi Yagasaki; Yasushi Fujinami, all of Kanagawa, Japan

[73] Assignee: Sony Corporation, Tokyo, Japan

[21] Appl. No.: 705,306

[22] Filed: Aug. 29, 1996

[30] Foreign Application Priority Data

Sep. 1, 1995 [JP] Japan ................................. 7-225038

[51] Int. Cl.⁶ .................................................. G11B 3/64
[52] U.S. Cl. ......................................................... 369/84
[58] Field of Search ............................ 369/32, 54, 48, 369/59, 60, 47, 58, 56, 84, 83

[56] References Cited

U.S. PATENT DOCUMENTS

| | | | |
|---|---|---|---|
| 5,453,968 | 9/1995 | Veldhuis et al. | 369/84 |
| 5,535,188 | 7/1996 | Dang et al. | 369/84 |

FOREIGN PATENT DOCUMENTS

| | | |
|---|---|---|
| 0 581 227 A | 2/1994 | European Pat. Off. . |
| 0 618 723 A | 10/1994 | European Pat. Off. . |
| 0 667 720 A | 8/1995 | European Pat. Off. . |
| 3-125375 | 5/1991 | Japan ................. 369/84 |
| 6-4884 | 1/1994 | Japan ................. 369/84 |

*Primary Examiner*—Nabil Hindi
*Attorney, Agent, or Firm*—William S. Frommer; Alvin Sinderbrand

[57] ABSTRACT

A formatting apparatus authenticates an information signal prior to mass duplication of the signal by analyzing the signal to detect the presence or absence of a security signal therein, inserting a security signal into the information signal, and recording the modified signal only if no security signal was detected.

30 Claims, 18 Drawing Sheets

FIG. 2A

| video_sequence( ) { | No. of bits | Mnemonic |
|---|---|---|
| next_start_code( ) | | |
| sequence_header( ) | | |
| if(nextbits( )==extension_start_code) { | | |
|   sequence_extension( ) | | |
|   do { | | |
|     extension_and_user_data(0) | | |
|     do { | | |
|       if(nextbits( )==group_start_code) { | | |
|         group_of_pictures_header( ) | | |
|         extension_and_user_data(1) | | |
|       } | | |
|       picture_header( ) | | |
|       picture_coding_extension_( ) | | |
|       extension_and_user_data(2) | | |
|       picture_data( ) | | |
|     } while((nextbits( )==picture_start_code)|| | | |
|       (nextbits( )==group_start_code)) | | |
|     if(nextbits( )!=sequence_end_code) { | | |
|       sequence_header( ) | | |
|       sequence_extension( ) | | |
|     } | | |
|   } while(nextbits( )!=sequence_end_code) | | |
| } else { | | |
|   /*ISO/IEC 11172-2*/ | | |
| } | | |
| sequence_end_code | 32 | bslbf |
| } | | |

FIG. 2B

| extension_and_user_data(i) { | No. of bits | Mnemonic |
|---|---|---|
| while((nextbits( )= =extension_start_code)\|\| | | |
| (nextbits( )= =user_data_start_code)) { | | |
| if((i!=1)&&(nextbits( )= =extension_start_code)) | | |
| extension_data(i) | | |
| if(nextbits( )= =user_data_start_code) | | |
| user_data( ) | | |
| } | | |
| } | | |

| user_data( ) { | No. of bits | Mnemonic |
|---|---|---|
| user_data_start_code | 32 | bslbf |
| while(nextbits( ) != '0000 0000 0000 0000 0000 0001') | | |
| user_data | 8 | uimsbf |
| } | | |
| next_start_code( ) | | |
| } | | |

| Group of_pictures_header ( ) { | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code ( ) | | |
| } | | |

| slice ( ) | No. of bits | Mnemonic |
|---|---|---|
| slice_start_code | 32 | bslbf |
| if (vertical_size > 2800) | | |
| slice_vertical_position_extension | 3 | uimsbf |
| If( <sequence_scalable_extension( ) is present in the bitstream> ) { | | |
| if (scalable_mode == "data partitionig") | | |
| priority_breakpoint | 7 | uimsbf |
| } | | |
| quantiser_scale_code | 5 | uimsbf |
| if (nextbits( ) == '1') { | | |
| intra_slice_flag | 1 | bslbf |
| intra_slice | 1 | uimsbf |
| reserved_bits | 7 | uimsbf |
| while (nextbits( ) == '1') { | | |
| extra_bit_slice /*with the value '1'*/ | 1 | uimsbf |
| extra_information_slice | 8 | uimsbf |
| } | | |
| } | | |
| extra_bit_slice /* with the value '0' */ | 1 | uimsbf |
| do { | | |
| macroblock ( ) | | |
| } while (nextsbits( ) != '0000 0000 0000 0000 0000 0000') | | |
| next_start_code ( ) | | |
| } | | |

316 → (quantiser_scale_code row highlighted)

| | No. of bits | Mnemonic |
|---|---|---|
| macroblock() { | | |
| while(nextbits() = = '0000 0001 000') | | |
| macroblock_escape | 11 | bslbf |
| macroblock_address_increment | 1-11 | vlclbf |
| macroblock_modes() | | |
| if(macroblock_quant) | | |
| quantiser_scale_code | 5 | uimsbf |
| if(macroblock_motion_forward|| | | |
| (macroblock_intra && concealment_motion_vectors)) | | |
| motion_vectors(0) | | |
| if(macroblock_motion_backward) | | |
| motion_vectors(1) | | |
| if(macroblock_intra && concealment_motion_vectors) | | |
| marker_bit | 1 | bslbf |
| if(macroblock_pattern) | | |
| coded_block_pattern() | | |
| for(i=0;i<block_count;i++) { | | |
| block(i) | | |
| } | | |
| } | | |

320 → (macroblock_modes row)
322 → (quantiser_scale_code row)

FIG. 3D

| | No. of bits | Mnemonic |
|---|---|---|
| macroblock_modes() { | | |
| macroblock_type | 1-9 | vlclbf |
| if((spatial_temporal_weight_code_flag==1)&& | | |
| (spatial_temporal_weight_code_table_index!='00')) { | | |
| spatial_temporal_weight_code | 2 | uimsbf |
| } | | |
| if(macroblock_motion_forward|| | | |
| macroblock_motion_backward) { | | |
| if(picture_structure=='frame') { | | |
| if(frame_pred_frame_dct==0) | | |
| frame_motion_type | 2 | uimsbf |
| } else { | | |
| field_motion_type | 2 | uimsbf |
| } | | |
| } | | |
| if((picture_structure=="Frame picture")&& | | |
| (frame_pred_frame_dct==0)&& | | |
| (macroblock_intra||macroblock_pattern)) { | | |
| dct_type | 1 | uimsbf |
| } | | |
| } | | |

VARIABLE LENGTH CODES FOR macroblock_type IN I-PICTURES

FIG. 4B

VARIABLE LENGTH CODES FOR macroblock_type IN P-PICTURES ← 404

| macroblock_type VLC code | macroblock_quant | macroblock_motion_forward | macroblock_motion_backward | macroblock_pattern | macroblock_intra | spatial_temporal_weight_code_flag | permitted spatial_temporal_weight_classes | Description |
|---|---|---|---|---|---|---|---|---|
| 1 | 0 | 1 | 0 | 1 | 0 | 0 | 0 | MC, Coded |
| 01 | 0 | 0 | 0 | 1 | 0 | 0 | 0 | No MC, Coded |
| 001 | 0 | 1 | 0 | 0 | 0 | 0 | 0 | MC, Not Coded |
| 00011 | 0 | 0 | 0 | 0 | 1 | 0 | 0 | Intra |
| 00010 | 1 | 1 | 0 | 1 | 0 | 0 | 0 | MC, Coded Quant |
| 00001 | 1 | 0 | 0 | 1 | 0 | 0 | 0 | No MC, Coded Quant |
| 000001 | 1 | 0 | 0 | 0 | 1 | 0 | 0 | Intra Quant |

VARIABLE LENGTH CODES FOR macroblock_type IN B-PICTURES

| macroblock_type VLC code | macroblock_quant | macroblock_motion_forward | macroblock_motion_backward | macroblock_pattern | macroblock_intra | spatial_temporal_weight_code_flag | permitted spatial_temporal_weight_classes | Description |
|---|---|---|---|---|---|---|---|---|
| 10     | 0 | 1 | 1 | 0 | 0 | 0 | 0 | Interp, Not Coded |
| 11     | 0 | 1 | 1 | 1 | 0 | 0 | 0 | Interp, Coded |
| 010    | 0 | 0 | 1 | 0 | 0 | 0 | 0 | Bwd, Not Coded |
| 011    | 0 | 0 | 1 | 1 | 0 | 0 | 0 | Bwd, Coded |
| 0010   | 0 | 1 | 0 | 0 | 0 | 0 | 0 | Fwd, Not Coded |
| 0011   | 0 | 1 | 0 | 1 | 0 | 0 | 0 | Fwd, Coded |
| 00011  | 0 | 0 | 0 | 0 | 1 | 0 | 0 | Intra |
| 00010  | 1 | 1 | 1 | 1 | 0 | 0 | 0 | Interp, Coded, Quant |
| 000011 | 1 | 1 | 0 | 1 | 0 | 0 | 0 | Fwd, Coded, Quant |
| 000010 | 1 | 0 | 1 | 1 | 0 | 0 | 0 | Bwd, Coded, Quant |
| 000001 | 1 | 0 | 0 | 0 | 1 | 0 | 0 | Intra, Quant |

F I G. 9

| 1 | 2 | 3 | 4 | 5 | ......... | n-1 | n |
|---|---|---|---|---|-----------|-----|---|
| 1 | 0 | 1 | 1 | 0 | ......... | 1 | 0 |

DIGITAL VIDEO COPY PROTECTION SYSTEM

BACKGROUND OF THE INVENTION

This invention relates to a method for protecting digital data from unauthorized mass duplication. More specifically, this invention relates to a method for copy protecting digital video signals recorded on a storage medium, such as a compact disc.

The recent development of consumer electronics incorporating devices for the reproduction of digitally-recorded audio and video data has resulted in the corresponding development of a vast consumer market for digitally-recorded media. Such digitally-recorded media are available in a number of different forms, including optical disc, magnetic disc, magneto-optical disc, magnetic tape, cartridge, and the like. Commonly, many of these forms of digitally-recorded media are available for sale or rental. Additionally, consumers may access and retrieve for storage digital audio and video data from cable systems, computer networks, satellite transmission systems, and the like.

Generally, prerecorded digital media contain a complete and virtually error-free duplicate of original data reproduced from an original digital master recording. As is well known in the art, digital data stored on a prerecorded digital medium may be reproduced many times without significantly affecting the quality of the stored data. Hence, a prerecorded digital medium may itself be utilized as a template from which many additional copies of digital data may be reproduced and recorded on other digital media.

The ease with which such reproduction and recording operations may occur and the high quality of the resulting recordings has facilitated the development of significant efforts to produce and distribute counterfeit prerecorded digital media. Although counterfeiting may occur in small volumes through the use of consumer recording/reproducing devices, a more significant problem has arisen from the use of mass production recording devices. In the optical disc industry, optical discs are mass produced with a formatting device, termed a "formatter", which reproduces digital data from a master recording and records the reproduced data onto an "original" disc. A stamping template, "stamper", is made from this "original" disc. The "stamper" thus created, may then be used to produce large numbers of optical discs, e.g. ROM discs, bearing the original digital data. Hereinbelow, the mass produced optical discs will be referred to as "retail discs."

At present, it is difficult, if not impossible, for an optical disc producer to determine the authenticity of or legal title to a particular master version of digital data provided by a third party. For example, a counterfeiter may bring an illegally obtained master recording, "original" disc, or "stamper", or even a retail disc, to an optical disc producer for mass reproduction of the recorded digital data. Unable to verify the authenticity of or legal title to the digital data supplied by the counterfeiter, the optical disc producer may unwittingly mass produce optical discs bearing the counterfeiter's digital data. Such counterfeit optical discs have the potential to be indistinguishable from retail discs produced under proper authority from legal master recordings.

OBJECTS AND SUMMARY OF THE INVENTION

An object of the present invention is to provide apparatus for authenticating a digital recording prior to mass duplication of the recording.

Another object of the present invention is to provide formatting apparatus for determining the authenticity of a digital recording prior to mass duplication of the recording.

Still another object of the present invention is to provide formatting apparatus for inhibiting the mass duplication of a digital recording purchased at retail.

Yet another object of the present invention is to imbed security data into a digital recording to prevent mass duplication of that recording.

In accordance with an aspect of the present invention, a formatting device for the authentication and mass duplication of an information signal recorded on a storage medium is provided. The device includes a first receiving device for receiving the information signal and a second receiving device for receiving a key signal. A key signal detection device, analyzes the information signal to detect the key signal in the information signal. A key insertion device, inserts the key signal into the information signal to produce a modified information signal. A recording device records the modified information signal if the key signal is not detected in the information signal and inhibits the recording of the modified information signal if the key signal is detected in the information signal.

According to another aspect of the present invention, a method for the authentication and mass duplication of an information signal recorded on a storage medium is provided. The method includes the steps of: receiving the information signal; receiving a key signal; analyzing the information signal to detect the key signal in the information signal; inserting the key signal into the information signal to produce a modified information signal; recording the modified information signal if the key signal is not detected in the information signal; and inhibiting the recording of the modified information signal if the key signal is detected in the information signal.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 2A is a data area diagram of a video sequence data area;

FIG. 2B is a data area diagram of a extension-and-user-data area;

FIG. 2C is a data area diagram of a user-data data area;

FIG. 2D is a data area diagram of a group-of-pictures-header data area;

FIG. 3B is a data area diagram of a slice data area;

FIG. 3C is a data area diagram of a macroblock data area;

FIG. 3D is a data area diagram of a macroblock-modes data area;

FIGS. 4A, 4B and 4C are data area diagrams of macroblock type data areas;

FIG. 9 is a diagram of a multibit key data;

DETAILED DESCRIPTION OF THE PREFERRED EMBODIMENTS

Figure 1:
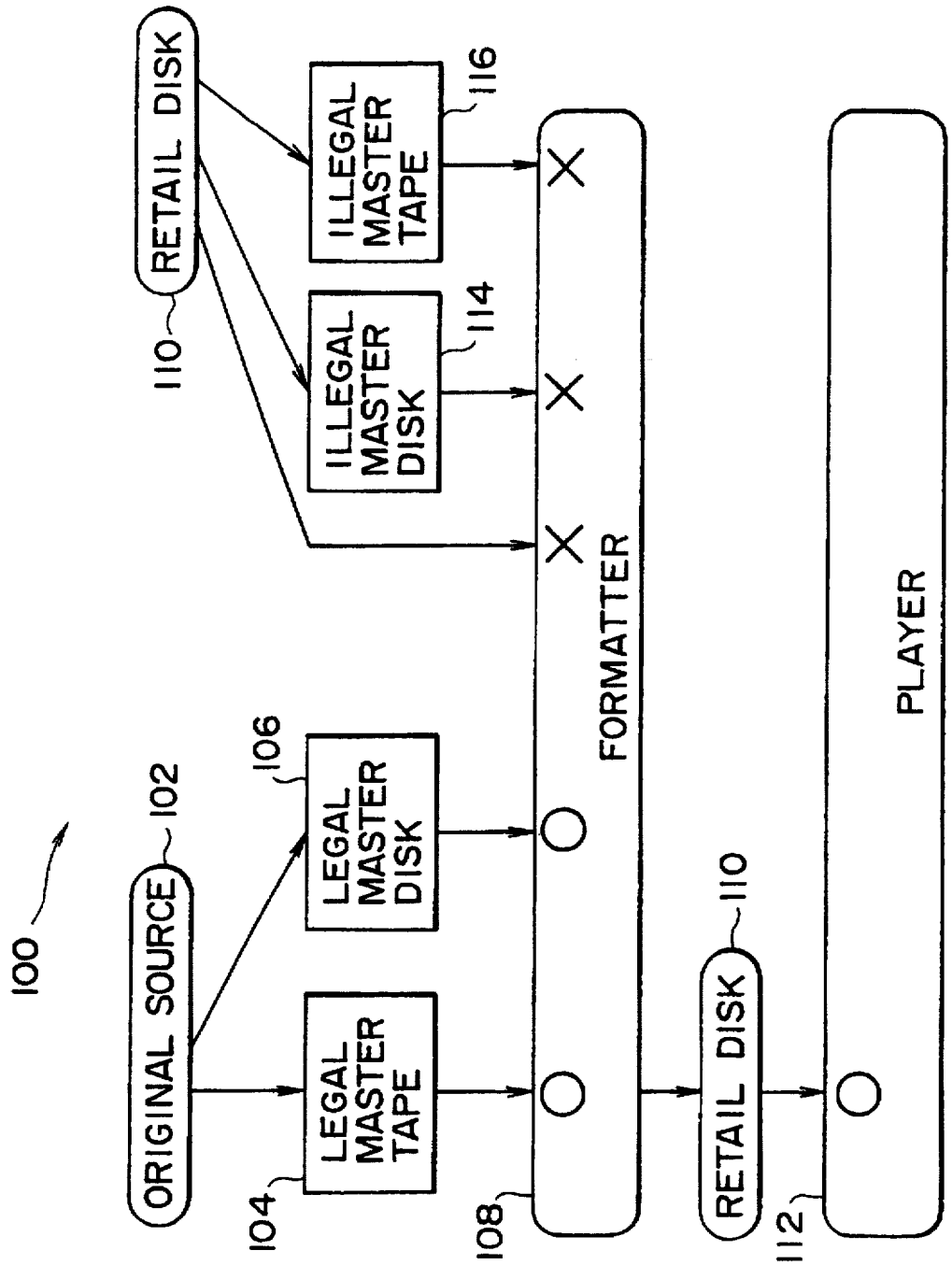
FIG. 1 is a procedural diagram of a copy protection methodology according to an embodiment of the present invention.

FIG. 1 schematically illustrates a copy protection methodology 100 according to the present invention. According to the copy protection methodology 100, an original source 102 of information is digitally recorded to produce a legal master tape 104 and a legal master disc 106. The recording process may occur at a broadcasting station, a sound studio, a video production facility, or the like.

The original source 102 may include audio signals, video signals, text data, digital data, and the like, which may be encoded or compressed. For example, video signals may be processed according to an MPEG standard. Legal master tape 104 is preferably a magnetic tape and legal master disc 106 is preferably a high-density magneto-optical disc. Of course, tape 104 and disc 106 may each be substituted with any suitable storage medium, such as a semiconductor memory, a magnetic disc, an optical disc, or the like.

The legal master tape 104 or the legal master disc 106 is supplied to an optical disc producer having a formatter 108. Formatter 108 reproduces the digital data corresponding to the original source information from the legal master and incorporates key data into the reproduced digital data. The modified digital data, incorporating key data, is recorded on mass quantities of optical discs intended for retail sale (retail disc 110). The key data serves to distinguish the digital data recorded on retail disc 110 from the digital data recorded on legal master tape 104 or legal master disc 106.

A consumer may reproduce the digital data stored on retail disc 110 with a disc player 112. The reproduced digital data may be displayed to the consumer via a display (not shown) coupled to disc player 112. The inclusion of key data in the digital data reproduced from retail disc 110 does not significantly affect the reproduction quality of the digital data corresponding to the original source information. Preferably, the incorporation of key data into the digital data corresponding to the source information does not result in flaws in the display of such digital data which would be perceptible to the consumer.

In the hands of a counterfeiter, digital data stored on retail disc 110 may be reproduced and recorded on an illegal master, such as illegal master disk 114 and illegal master tape 116. Illegal master disc 114 may comprise a high-density magneto-optical disc and illegal master tape 116 may comprise a magnetic tape. Alternatively, disc 114 and tape 116 may each be substituted with any suitable storage medium, such as a semiconductor memory, a magnetic disc, an optical disc, or the like.

The counterfeiter may then present retail disc 110, illegal master disc 114, or illegal master tape 116 to an optical disc producer, having a formatter 108, for mass duplication of the data stored thereon. Formatter 108 reproduces data from the storage medium supplied by the counterfeiter and detects key data in the reproduced data. The presence of key data indicates to the optical disc producer that the storage medium supplied by the counterfeiter is not an authorized master for the data stored thereon. Accordingly, the optical disc producer refuses to mass produce for the counterfeiter optical discs bearing such data. Specifically, formatter 108 may itself inhibit any duplication of data stored on a recording medium when key data is detected on the recording medium.

Conversely, when formatter 108 reproduces data from a storage medium, such as legal master tape 104 or legal master disc 106, which does not have key data stored thereon, formatter 108 does not detect any key data. The absence of key data indicates to the optical disc producer that the storage medium is an authorized master for the data stored thereon. However, the optical disc producer will not know whether the authorized master has been submitted for duplication by its legal owner (e.g. the legal master may have been stolen).

An optical disc producer may choose to ignore the presence of key data on a storage medium supplied by a counterfeiter and proceed to duplicate data stored upon that storage medium. Such duplication results in the production of counterfeit discs bearing unauthorized copies of the digital data.

The present invention is particularly suited for use in conjunction with video data encoded according to an MPEG standard. FIG. 2A illustrates a video sequence data area 200 defined in accordance with an MPEG standard.

In a first embodiment of the present invention, key data is stored in a data area defined for the storage of user data. Video sequence data area 200 includes an extension-and-user-data data area 202. FIG. 2B illustrates extension-and-user-data data area 202 which includes a user-data data area 204. FIG. 2C illustrates user-data data area 204 which may be utilized to store key data. In FIG. 2C and in certain subsequent drawings, diagonal hatching is used to highlight data areas where key data may be stored.

In a second embodiment of the present invention, key data is stored in a data area defined for the storage of header data. Video sequence data area 200 includes a group-of-pictures-header data area 206. FIG. 2D illustrates group-of-pictures-header data area 206 which includes a time-code data area 208. Key data may be stored in time-code data area 208 while information corresponding to time code data may be stored in another data area. In an application where a group-of-pictures includes 12 frames of video data, key data is preferably recorded once in a time-code data area 208 for each group-of-pictures.

Figure 3A:
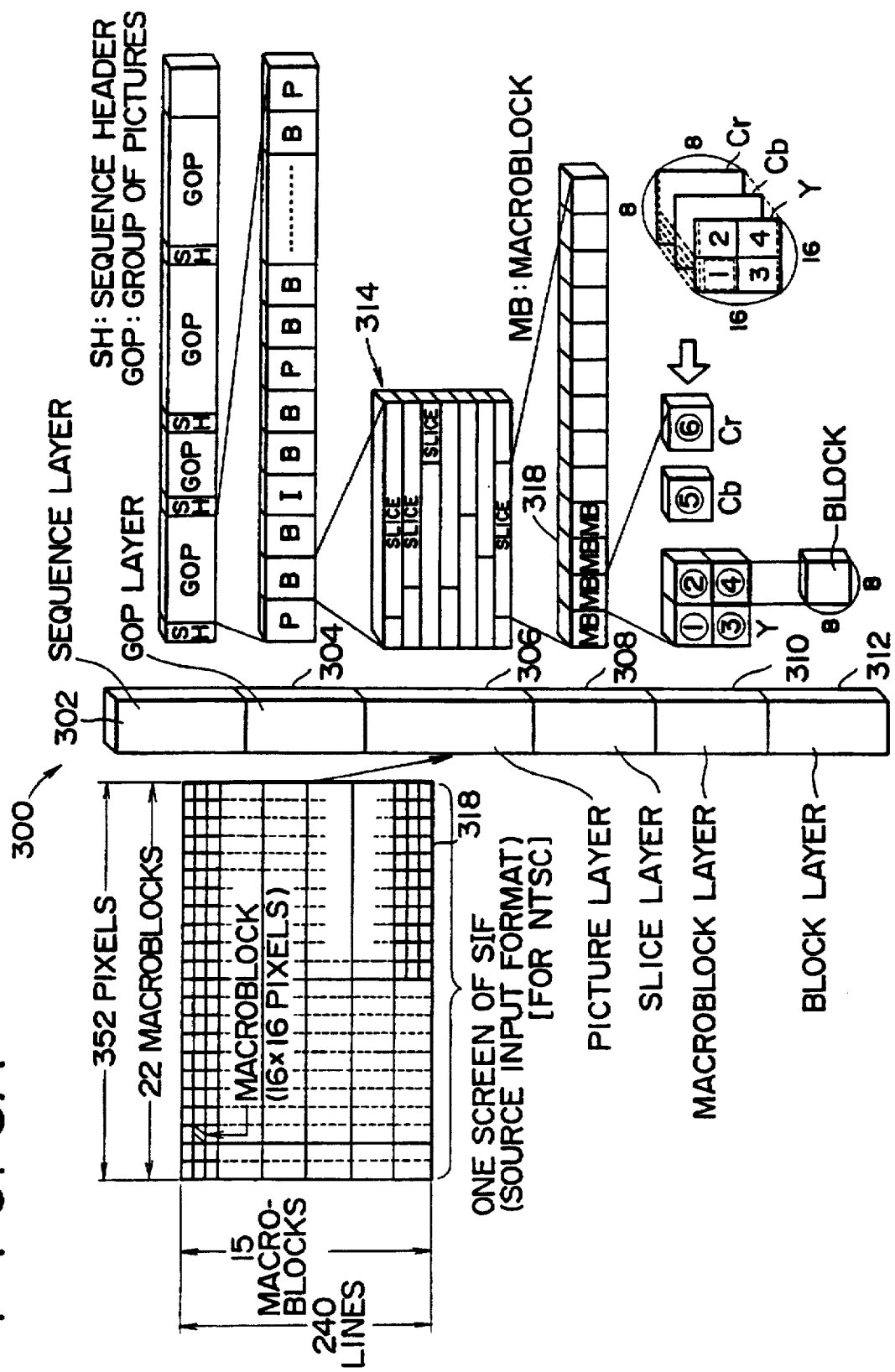
FIG. 3A is a block diagram of an MPEG layer structure.

In a third embodiment of the present invention, key data is stored in a data area defined for the storage of quantization data. FIG. 3A illustrates a layer structure 300 of data storage areas according to an MPEG standard. Layer structure 300 includes a sequence layer 302, a group-of-pictures (GOP) layer 304, a picture layer 306, a slice layer 308, a macroblock (MB) layer 310, and a block layer 312. Sequence layer 302 includes a sequence header data area (SH) and a group of pictures data area (GOP).

In GOP layer 304, each GOP data area includes an intra-coded frame (I frame), a number of predictively-encoded pictures (P pictures), and a number of bidirectionally-predictively-encoded pictures (B pictures). In picture layer 306, each picture includes a number of slice data areas 314. In slice layer 308, each slice data area 314 includes a number of macroblocks.

In macroblock layer 310, each macroblock includes a number of blocks of pixel data. For example, brightness data may be stored as four blocks of pixel data and color difference data (Cb, Cr) may be stored as one block of pixel data. In a preferred quantization operation, each block of pixel data is transformed according to a discrete cosine transform (DCT) and the resulting DCT coefficients are quantized. Different levels of quantization may be achieved, each quantization level corresponding to a particular quantization step.

Alternatively, in an NTSC-compatible implementation, also shown in FIG. 3A, a picture layer 306 includes a screen of source input format (SIF) which includes 240 lines. Each line includes 352 pixels. The pixels are organized into macroblocks of 16×16 pixels.

FIG. 3B illustrates a slice data area 314 which includes a quantiser-scale-code (SQUANT) data area 316. SQUANT data area 316 is defined to store a quantization level for each slice data area 314. However, instead of storing a quantization level, SQUANT data areas 316 may store key data. The quantization level information may be stored on a block-by-block basis in each macroblock.

FIG. 3C illustrates a macroblock data area 318 which includes a macroblock-modes data area 320 and a quantiser-scale code (MQUANT) data area 322. Quantization level information may be stored in each MQUANT data area 322 and, therefore, different macroblocks within a slice may be compressed according to different levels of quantization.

Figure 4A:
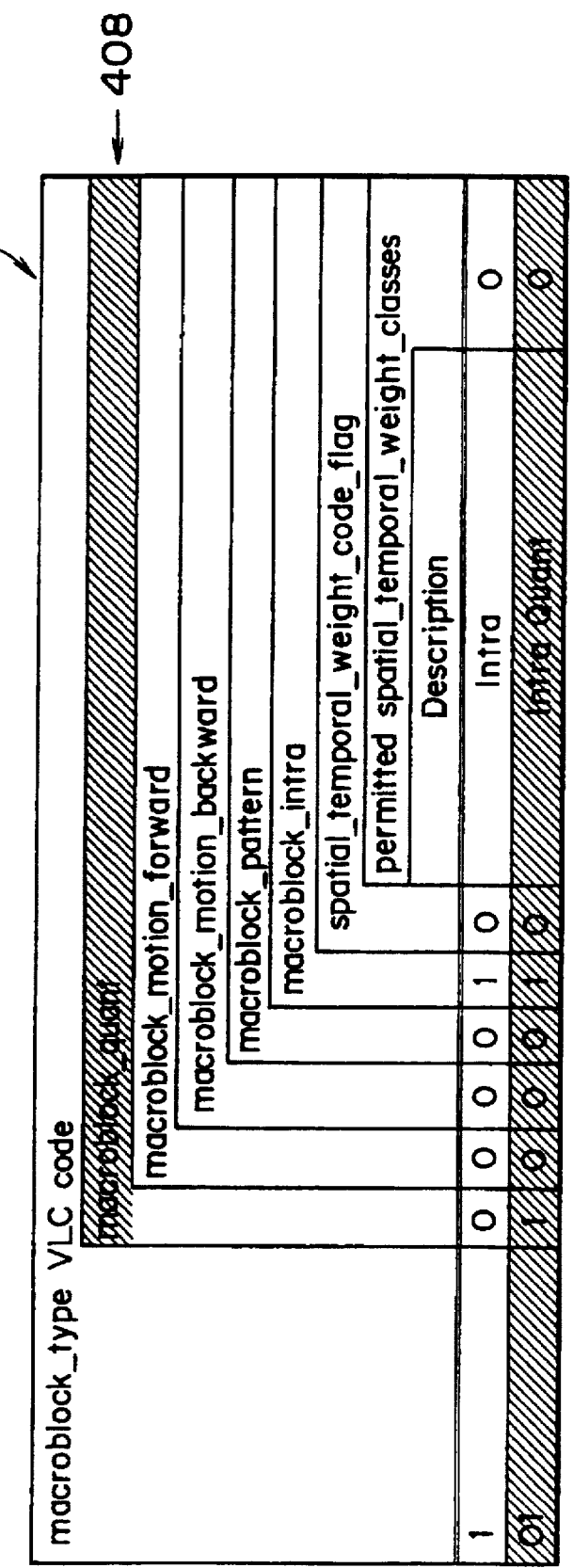

FIG. 3D illustrates a macroblock-modes data area 320 which includes a macroblock-type data area 400. The particular arrangement of macroblock-type data area 400 depends upon the type of picture of which it is a part. FIG. 4A illustrates a macroblock-type data area 402 for an I frame which includes a macroblock-quant data area 408. FIG. 4B illustrates a macroblock-type data area 404 for a P frame which includes a macroblock-quant data area 408. FIG. 4C illustrates a macroblock-type data area 406 for a B frame which includes a macroblock-quant data area 408.

When quantization level information is stored in a particular MQUANT data area 322, a positive "1" flag is stored in the macroblock-quant data area 408 in the macroblock-type data area 400 (e.g. area 402, area 404, or area 406) of the corresponding macroblock-modes data area 320. The positive "1" flag indicates that quantization level information has been stored in the corresponding MQUANT data area 322.

To replace the storage of quantization level information in a SQUANT data area 316, the MQUANT data area 322 of one or more macroblock data areas 318 in the corresponding slice can be utilized to store such quantization level information for the entire slice or for a number of constituent macroblocks.

The above-described first, second, and third embodiments of the present invention may be rendered ineffective by a counterfeiter who deletes, overwrites, or otherwise modifies the stored key data. Alteration of the stored key data may not be detectable as it may not adversely affect reproduction and display of the associated digital data, e.g. original source information.

Figure 5:
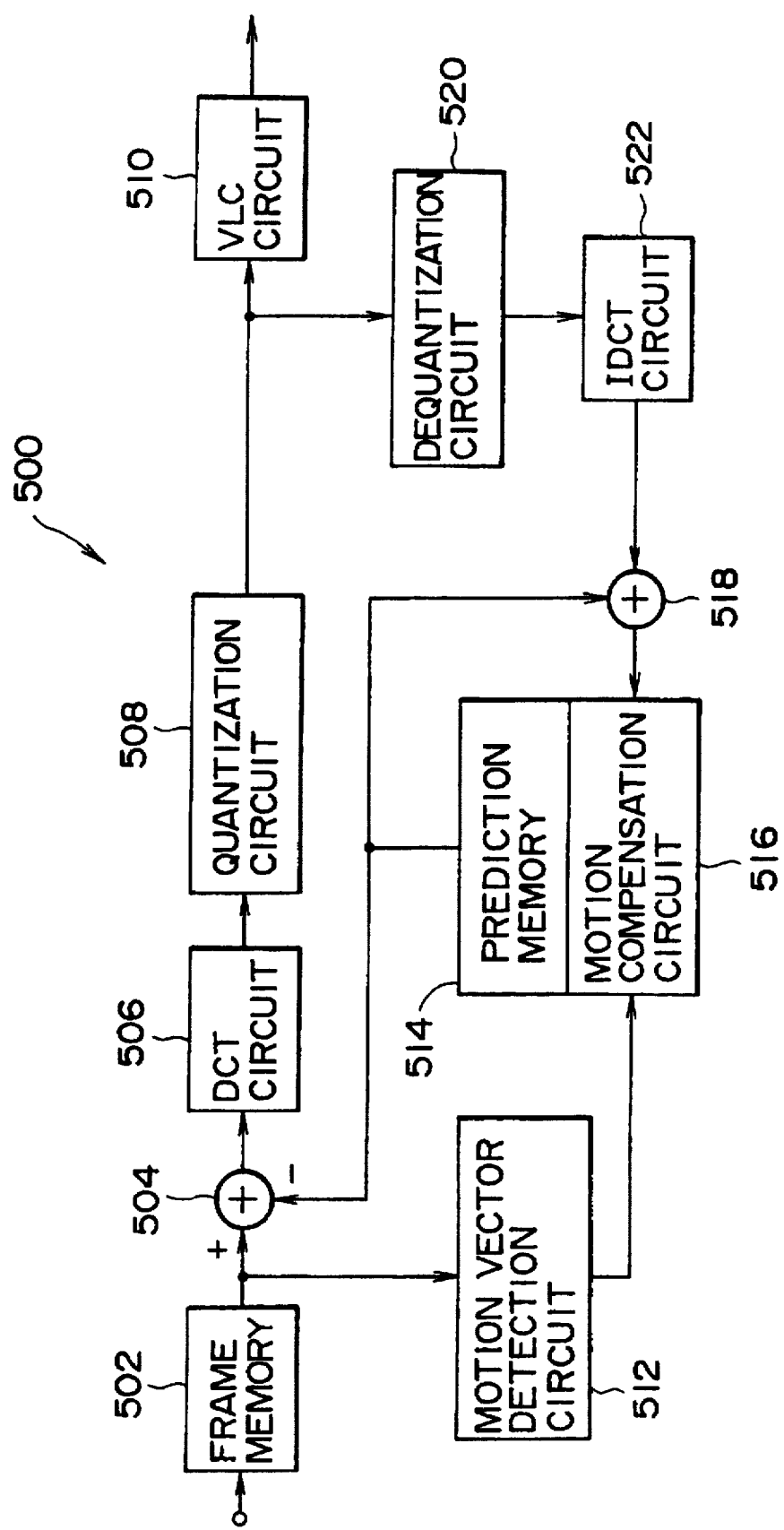
FIG. 5 is a block diagram of an encoder according to certain embodiments of the present invention.

FIG. 5 illustrates an encoder 500 for recording original source information 102 to produce a master recording, such as legal master disc 106, which is compatible with the key data encoding methods of the three embodiments described hereinabove. Encoder 500 includes a frame memory 502, addition circuits 504 and 518, a DCT circuit 506, a quantization circuit 508, a variable length coding (VLC) circuit 510, a motion vector detection circuit 512, a prediction memory 514, a motion compensation circuit 516, a dequantization circuit 520, and an inverse discrete cosine transform (IDCT) circuit 522.

Each of frame memory 502 and prediction memory 514 is a conventional memory device, such as a semiconductor memory, a magnetic tape, a magnetic disc, and the like. Addition circuit 504 is a signal combiner for combining signals by addition, subtraction and the like. Addition circuit 518 is a signal combiner for combining signals by addition and the like. DCT circuit 506 is a discrete cosine transform circuit for transforming data according to a discrete cosine transform method. Quantization circuit 508 is a quantizer for compressing data by a quantization method. Variable length coding circuit 510 is an encoder for variable length encoding data.

Motion vector detection circuit 512 is a processing circuit for determining motion vectors in data. Motion compensation circuit 516 is a processing circuit for motion compensating data. Dequantization circuit 520 is a dequantizer for dequantizing quantized data. Inverse discrete cosine transform circuit (IDCT) 522 is transform circuit for processing data according to an inverse discrete cosine transform method.

Original source information 102, such as a digital video signal, is supplied to frame memory 502. Memory 502 stores the original source information 102 and supplies the original source information 102 to addition circuit 504 and to motion vector detection circuit 512. Addition circuit 504 combines the original source information with motion compensation information supplied from prediction memory 514 and supplies the resulting combination to DCT circuit 506. Preferably, addition circuit 504 subtracts the motion compensation information from the original source information. Specifically, where the original source information comprises an I frame, addition circuit 504 passes the I frame directly to DCT circuit 506. Where the original source information comprises a P frame or a B frame, addition circuit subtracts motion compensation information supplied from prediction memory 514 from the frame and supplies the difference data to DCT circuit 506.

Motion vector detection circuit 512 processes the original source information 102 to determine motion vector information. Motion vector information is supplied to motion compensation circuit 516.

DCT circuit 506 transforms the signal supplied by circuit 504 to produce DCT coefficient data which is supplied to quantization circuit 508. Preferably, DCT circuit 506 converts each block of data in each macroblock into DCT coefficients Coeff[u] [v]. Further details regarding the DCT processing are provided in conjunction with the discussion of FIG. 7. Quantization circuit 508 quantizes the DCT coefficient data to produce quantized data which is supplied to VLC circuit 510 and to dequantization circuit 520. Preferably, quantization circuit 508 converts DCT coefficients Coeff[u] [v] into quantization levels QF[u] [v]. The quantization levels QF[u] [v] are zigzag scanned as explained in conjunction with FIG. 8.

Dequantization circuit 520 dequantizes the quantized data to produce unquantized data which is supplied to IDCT circuit 522. IDCT circuit 522 transforms the unquantized data to produce digital data which is supplied to addition circuit 518. Addition circuit 518 combines the digital data with motion compensation information supplied from prediction memory 514 to recover original source information and supplies the recovered original source information to motion compensation circuit 516.

Motion compensation circuit 516 processes the recovered original source information in accordance with the motion vector information supplied by motion vector detection circuit 512 to produce motion compensation information, such as a motion predictive image. The motion compensation information is stored in prediction memory 514 for supply to addition circuits 504 and 518.

VLC circuit 510 encodes quantized data supplied by quantization circuit 508 to produce variable-length coded data which are supplied for recording on a master storage medium, such as a legal master disc or a legal master tape. In accordance with the first embodiment, VLC circuit 510 incorporates user-data data areas in the variable-length coded data. In accordance with the second embodiment, VLC 510 incorporates time-code data areas in the variable-length coded data. In accordance with the third embodiment, VLC 510 incorporates SQUANT data areas in the variable-length coded data.

Figure 6:
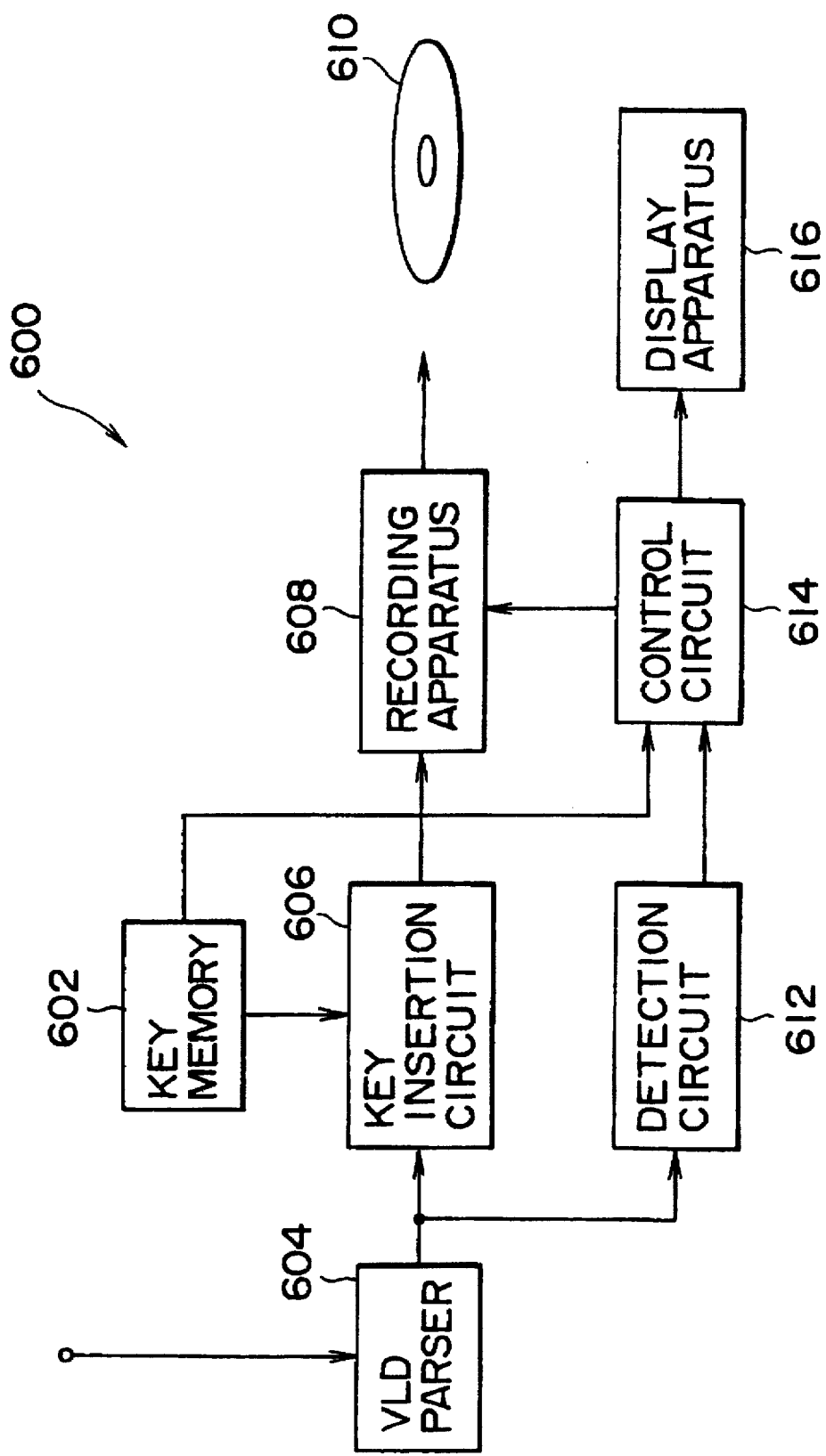
FIG. 6 is a block diagram of a formatter according to certain embodiments of the present invention.

FIG. 6 illustrates a formatter 600 for mass duplication of digital data reproduced from a master recording produced by encoder 500. Formatter 600 includes a key memory 602, a variable-length-decoder parser 604, a key insertion circuit 606, a recording apparatus 608, a detection circuit 612, a control circuit 614, and a display apparatus 616.

Key memory 602 is a conventional memory device, such as a semiconductor memory, a magnetic tape, a magnetic disc, and the like. Variable-length-decoder (VLD) parser 604 is a circuit for searching a stream of variable-length coded data to determine the positions of particular portions of data. Key insertion circuit 606 is a data insertion circuit for writing data into a stream of digitized data.

Recording apparatus 608 is a conventional recording apparatus for recording digital data on a storage medium such as an optical disc, a magneto-optical disc, a magnetic tape, a magnetic disc, a semiconductor memory, and the like. Detection circuit 612 is a circuit for recognizing the presence or absence of key data in a certain portion of data. Control circuit 614 is a control processor device, such as a microprocessor, for controlling the operation of a display and a recording apparatus. Display apparatus 616 is a display device for displaying predetermined visual images, such as text, to a user.

Digital data reproduced from a master recording is supplied to VLD parser 604. VLD parser 604 supplies the reproduced digital data to key insertion circuit 606 and analyzes the reproduced digital data to locate certain data areas incorporated into the reproduced digital data, e.g. data areas where key data may be stored, as indicated by the address information. In the first embodiment of the present invention, VLD parser 604 detects user-data data areas in the reproduced digital data and supplies position information regarding the position of the detected user-data data areas to key insertion circuit 606. In the second embodiment of the present invention, VLD parser 604 detects time-code data areas in the reproduced digital data and supplies position information regarding the position of the detected time-code data areas to key insertion circuit 606. In the third embodiment of the present invention, VLD parser 604 detects SQUANT data areas in the reproduced digital data and supplies position information regarding the position of the detected SQUANT data areas to key insertion circuit 606. Optionally, VLD parser 604 may extract data stored in the detected data area, variable-length decode such data, and supply the decoded extracted data to key insertion circuit 606.

VLD circuit 604 extracts data at the addressed location and supplies the extracted data to detection circuit 612. Detection circuit 612 analyzes the extracted data to determine the presence or absence of key data. The result of the determination is supplied to control circuit 614. Specifically, detection circuit 612 may read a portion of the extracted data and supply the read data to control circuit 614.

Control circuit 614 controls the operation of display apparatus 616 and the operation of recording apparatus 608 in accordance with the detection result obtained by detection circuit 612. As key data may be represented by a number of detection results, control circuit 614 may collect and analyze together a number of detection results from detection circuit 612 to determine the presence or absence of key data. Key memory 602 supplies reference key data to key insertion circuit 606 and to control circuit 614.

Preferably, control circuit 614 compares the detection result(s) supplied by detection circuit 612 with the reference key data. If the reference key data corresponds to the detection result(s) then key data has been detected; otherwise, key data has not been detected. If key data is not detected, control circuit 614 controls display apparatus 616 to display a predetermined display indicating to a user that no key data has been detected, e.g. that the reproduced data has been reproduced from a legal master, and controls recording apparatus 608 to record the reproduced digital data. If key data is detected, control circuit 614 controls display apparatus 616 to display a predetermined display indicating to a user that key data has been detected and controls recording apparatus 608 to inhibit recording of the reproduced digital data.

Key insertion circuit 606 inserts or otherwise writes key data into the reproduced digital data at the location indicated by the position information supplied by VLD parser 604. For example, key data may be written into a user-data area, a time-code data area, a SQUANT data area, or the like. Optionally, key insertion circuit 606 inserts or otherwise writes key data into the decoded extracted data, variable-length encodes such data, and incorporates such data into the reproduced digital data.

Key insertion circuit 606 supplies the modified digital data to recording apparatus 608. Under the control of control circuit 614, recording apparatus 608 may record the modified digital data onto an original storage medium, such as optical disc 610, or inhibit such recording. From the original storage medium a stamper may be produced for the mass production of storage media bearing the modified digital data. In this manner, storage media, such as optical discs, are produced with key data recorded thereupon.

According to a fourth embodiment of the present invention, key data is stored in a data area defined for the storage of digital data corresponding to original source information. For example, key data may be stored in a data area defined for the storage of video data, such as pixel data. More specifically, key data may be coded as a fixed length code and stored in data area defined for the storage of pixel data.

Figure 7:
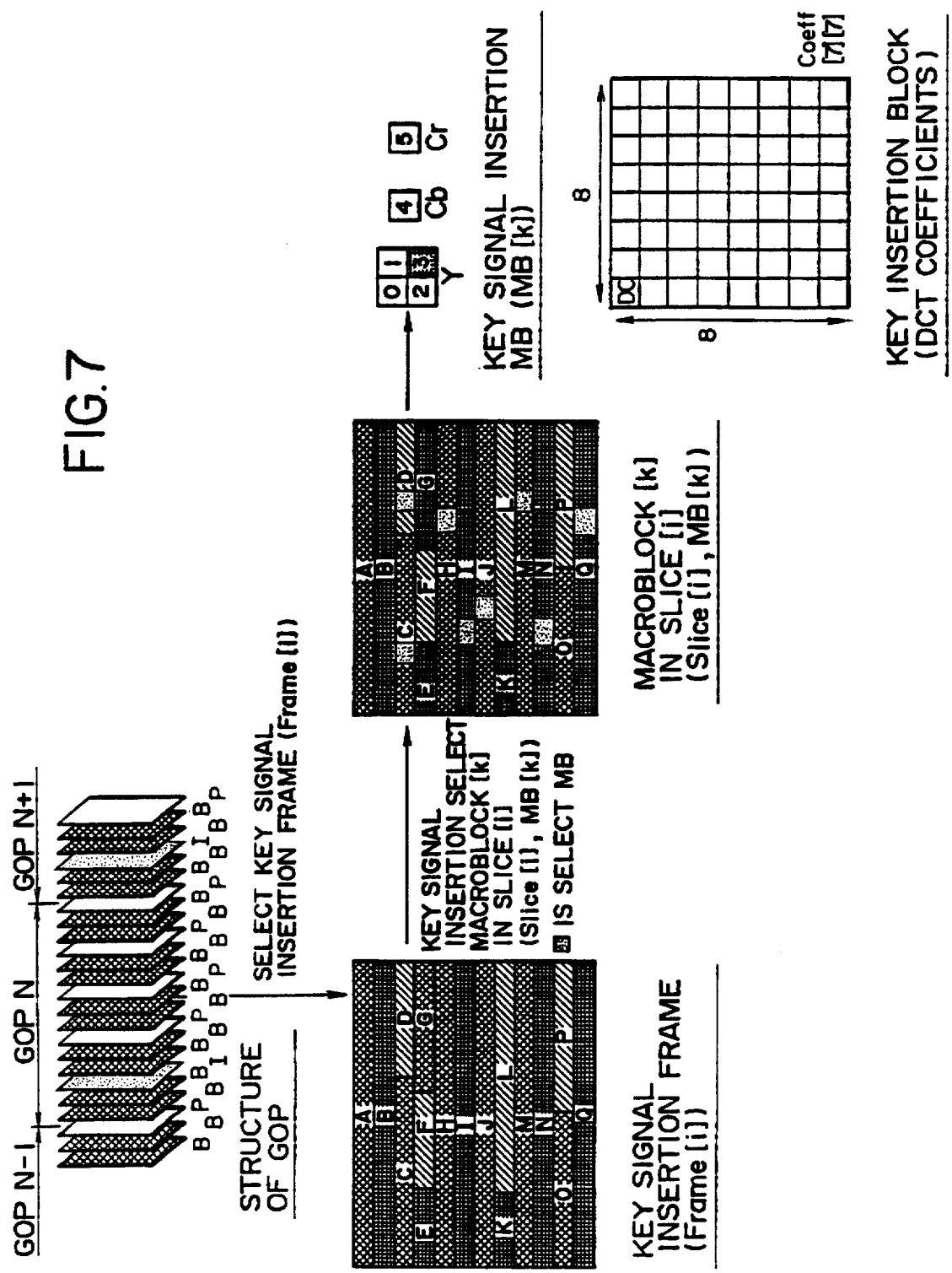
FIGS. 7 and 8 are procedural diagrams of a key data insertion point selection methodology.
Figure 8:
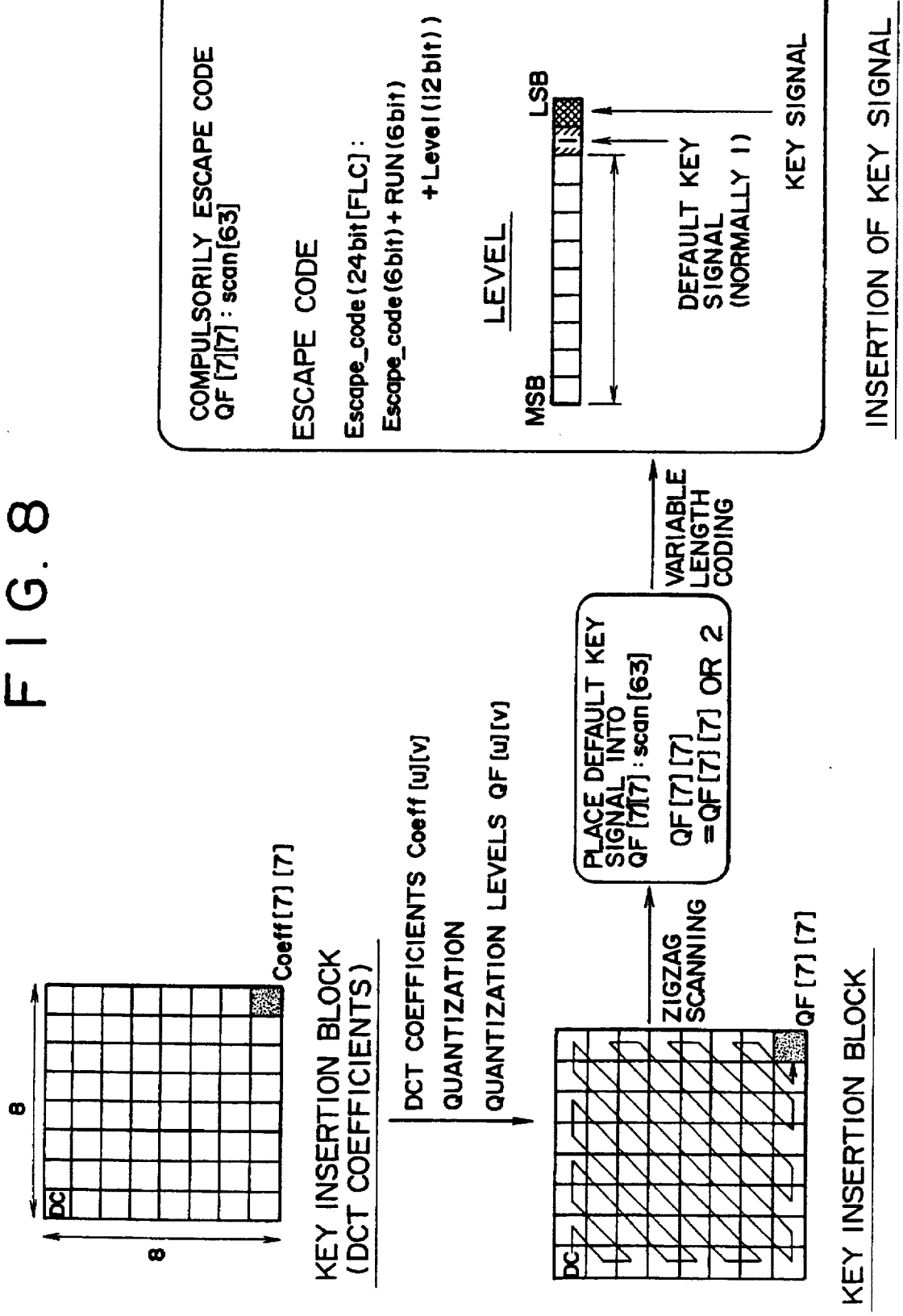

FIGS. 7 and 8 illustrate the selection of key data insertion points according to the present invention. As shown, from among a group of pictures contain "N" pictures, a single B frame is selected as the recipient of key data. Of course other frames may be selected to hold key data; however, it is preferred that a B frame store such data to minimize error caused by the displacement of video data with key data. In certain slices of the selected frame, a number of macroblocks are selected to receive key data. (The selected macroblocks have been depicted as dark rectangles.) One of the blocks in a selected macroblock is further selected to receive key data.

The selected block, preferably comprised of an 8×8 array of pixels, is discrete-cosine transformed to produce DCT coefficients Coeff[u] [v], shown in FIG. 8. DCT coefficients Coeff[u] [v] are quantized to produce quantization levels QF[u] [v]. Quantization levels QF[u] [v] are zigzag scanned (scan[0] to scan[63]) beginning with the quantization level which includes a DC component and ending with quantization levels including higher frequency components. The quantization level QF[7] [7], scan[63], corresponding to the highest frequency component, is selected as the data area for insertion of key data.

To insert key data into the selected data area, it is preferred that the value stored in the selected data area is modified such that the second least significant bit of such value equals logical "1". This insertion of key data may be achieved with a logical OR operation, e.g. QF[7] [7]=QF[7] [7] OR 2. Preferably, the least significant bit of the value stored in the selected data area is used to actually store the key data.

Further, the data located in selected data area QF[7] [7], scan[63], is coded as an escape code. Coding this data as an escape code ensures that the data will be included in the block in a fixed length code (FLC). As shown, an escape code is formed as a fixed length code that preferably includes a six-bit Escape_code data area, a six-bit RUN data area, and a 12-bit Level data area. The value stored in the Escape_code data area identifies the codeword as an escape code. The value stored in the RUN data area represents the number of quantization coefficients having a certain value, e.g. zero. The value stored in the Level data area represents the value of non-zero quantization coefficients.

The insertion of key data is compatible with escape coding according to an MPEG standard since the standard merely requires that the value stored in the Level data area of an escape code may not equal zero. By setting the second least significant bit in the Level data area to a logical zero value, the value stored in the Level data area will be nonzero always. Further, since only the two least significant bits of the Level data area are used for the storage of key data, the resulting introduction of error in the display of the corresponding image will be generally imperceptible to the ordinary viewer.

Figure 9:
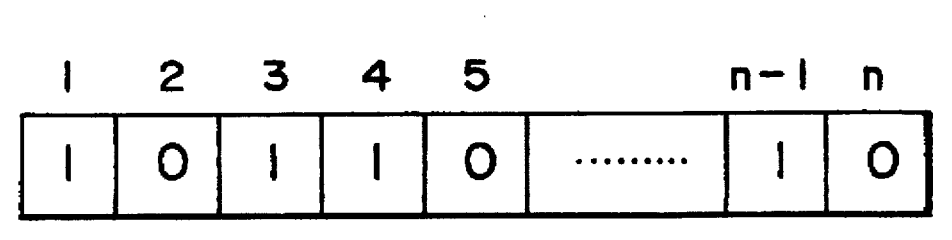

According to the above-described method, the least significant bit of a particular data area in one block of video data is used to store key data. To incorporate key data comprising a multiple bit code, multiple blocks of video data may be used to store individual bits of the multiple bit code. Of course, each block may be from the same or a different slice of data, frame of data, or the like. FIG. 9 illustrates the concatenation of "n" individual bits obtained from "n" blocks, respectively, to form "n"-bit key data.

Figure 10:
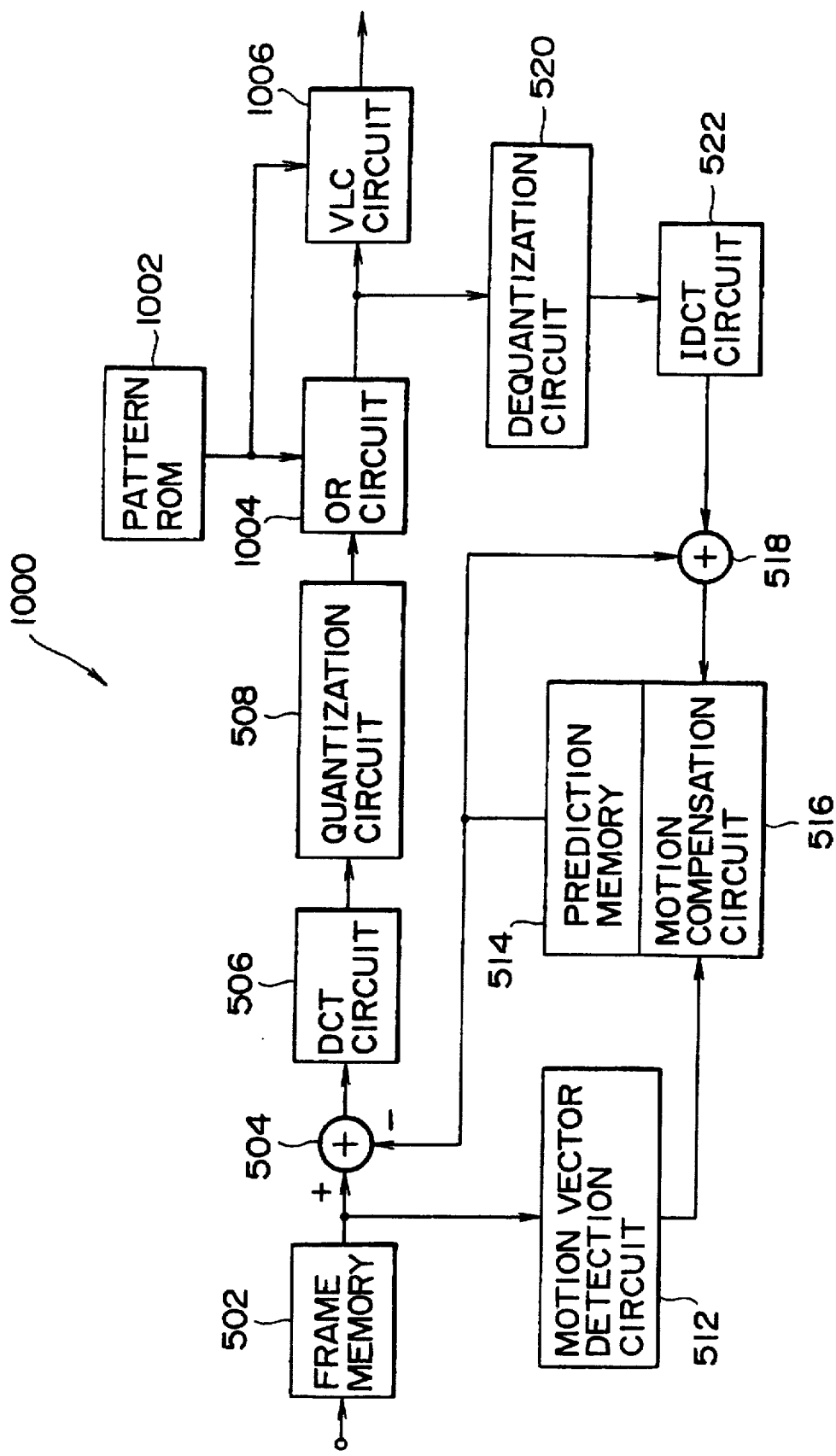
FIG. 10 is a block diagram of an encoder according to another embodiment of the present invention.

FIG. 10 illustrates an encoder 1000 for recording original source information 102 to produce a legal master, such as legal master disc 106, which is compatible with the key data encoding methods of the fourth embodiment described hereinabove. Encoder 1000 includes a frame memory 502, addition circuits 504 and 518, a DCT circuit 506, a quantization circuit 508, a motion vector detection circuit 512, a prediction memory 514, a motion compensation circuit 516, a dequantization circuit 520, and an inverse discrete cosine transform (IDCT) circuit 522 which have the same construction and function as the correspondingly numbered elements previously described. Encoder 1000 further includes a pattern ROM 1002, a logic OR circuit 1004, and a VLC circuit 1006.

Pattern ROM 1002 is a conventional storage device, such as a semiconductor memory or the like, for storing address information. Alternatively, pattern ROM 1002 may be replaced with a source of variable address information, such as an address calculating device, a random access memory device, or the like, for providing different address information. Logic OR circuit 1004 is a circuit for modifying certain portions of a signal to have a specific content, such as a logical "1". VLC circuit 1006 is a variable length encoding device for encoding quantized data according to a variable-length encoding method.

Processing of original source information 102 by frame memory 502, addition circuit 504, DCT circuit 506, and quantization circuit 508 occurs as described above. However, in encoder 1000, quantization circuit 508 supplies the quantized data to OR circuit 1004. Pattern ROM 1002 supplies address information to OR circuit 1004 and to VLC circuit 1006 regarding a particular portion of quantized data. Preferably, pattern ROM 1002 supplies information identifying a particular block or blocks of quantized data.

In accordance with the address information supplied by pattern ROM 1002, OR circuit 1004 modifies a particular portion of the quantized data supplied by quantizaton circuit 508 to facilitate storage of key data. Preferably, OR circuit 1004 modifies the second least significant bit of the last codeword in the block designated by pattern ROM 1002, e.g. QF[7] [7] of scan [63]. The second least significant bit is preferably modified to have a value equal to logical "1". The modified quantized data is supplied to VLC circuit 1006 and to dequantization circuit 52.

VLC circuit 1006 encodes the modified quantized data supplied by OR circuit 1004 to produce variable-length coded data which are supplied for recording on a master storage medium, such as a legal master disc or a legal master tape. Preferably, in accordance with address information supplied by pattern ROM 1002, VLC circuit 1006 encodes as an ESCAPE code a particular portion of the quantized data supplied by OR circuit 1004, e.g. QF[7] [7] of scan [63] of the block designated by pattern ROM 1002. The ESCAPE code is structured as Escape_code+RUN+Level as shown in FIG. 8.

Processing of the modified quantized data by dequantization circuit 520, IDCT circuit 522, adding circuit 518, and motion compensation circuit 516, along with motion vector processing by motion vector detection circuit 512 and motion compensation information storage by prediction memory 514, is achieved according to the method of operation previously described in connection with encoder 500.

Figure 11:
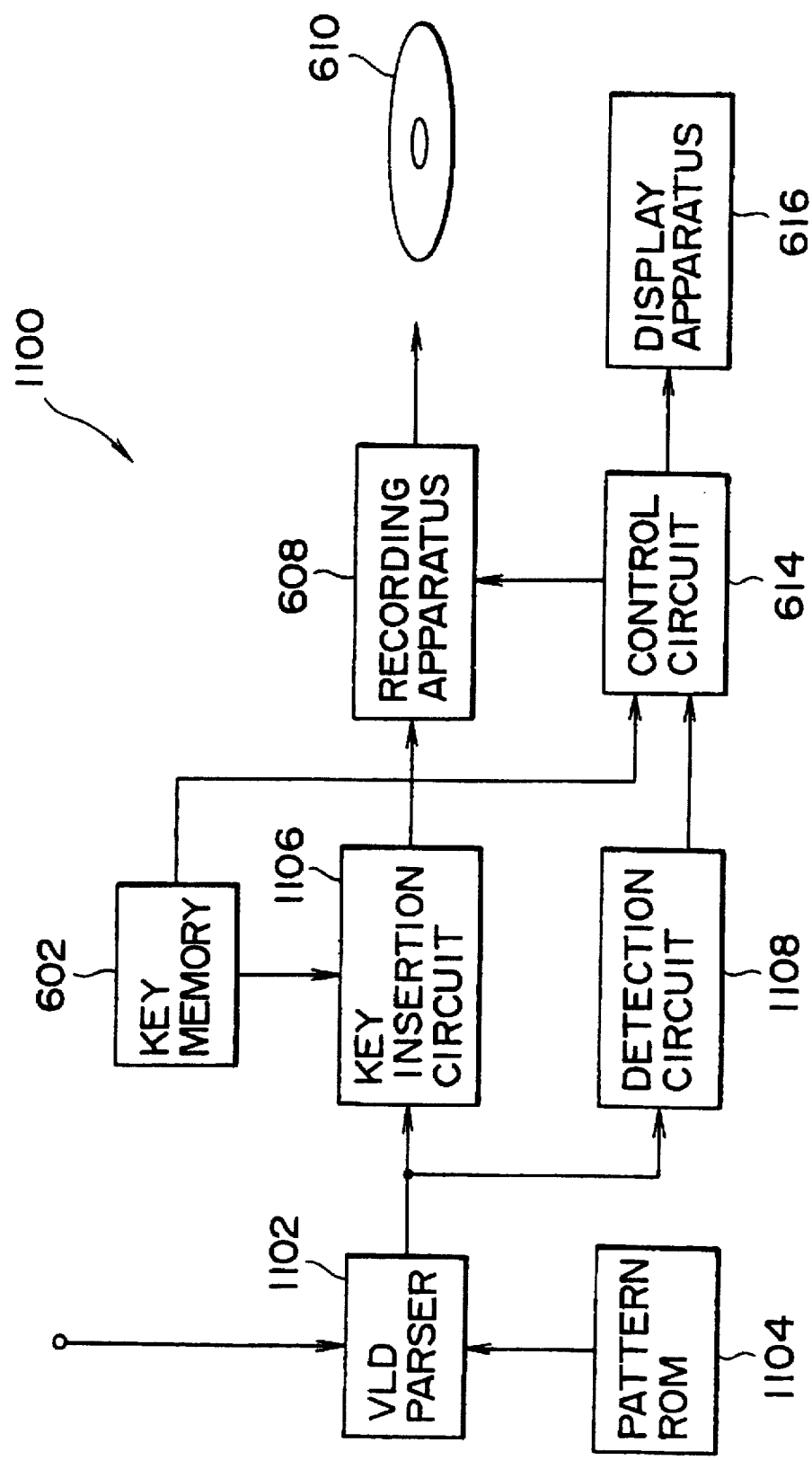
FIG. 11 is a block diagram of a formatter according to another embodiment of the present invention.

FIG. 11 illustrates a formatter 1100 for mass duplication of digital data reproduced from a master recording produced by encoder 1000. Formatter 1100 includes a key memory 602, a recording apparatus 608, a control circuit 614, and a display apparatus 616 which have the same construction and function as the correspondingly numbered elements previously described. Formatter 1100 further includes a variable-length-decoder (VLD) parser 1102, a pattern ROM 1104, a key insertion circuit 1106, and a detection circuit 1108.

Variable-length-decoder (VLD) parser 1102 is a circuit for searching a stream of variable-length coded data to determine the positions of particular portions of data. Pattern ROM 1104 is a conventional storage device, such as a semiconductor memory or the like, for storing address information. Preferably, pattern ROM 1104 stores the same address information as is stored in pattern ROM 1002. Alternatively, pattern ROM 1104 may be replaced with a source of variable address information, such as an address calculating device, a random access memory device, or the like, for providing different address information. Key insertion circuit 1106 is a data insertion circuit for writing data into a stream of digitized data. Detection circuit 1108 is a circuit for recognizing the presence or absence of key data in a certain portion of data.

Digital data reproduced from a master recording and address information supplied by pattern ROM 1104 is supplied to VLD parser 1102. VLD parser 1102 supplies the reproduced digital data to key insertion circuit 1106 and analyzes the reproduced digital data to locate certain data areas incorporated into the reproduced digital data, e.g. data areas where key data may be stored, as indicated by the address information. Preferably, address information supplied by pattern ROM 1104 pertains to the position of data located at QF[7] [7] in scan [63] of a particular data block indicated by the address information.

VLD parser 1102 detects data located at QF[7] [7] in scan [63] of the data block indicated by the address information and supplies position information regarding the position of the detected data areas to key insertion circuit 1106. Optionally, VLD parser 1102 may extract data stored in the detected data area, variable-length decode such data, and supply the decoded extracted data to key insertion circuit 1106. VLD parser 1102 extracts data at the addressed location and supplies the extracted data to detection circuit 1108.

Detection circuit 1108 analyzes the extracted data to determine the presence or absence of key data. Preferably, detection circuit 1108 determines whether the second least significant bit of QF[7] [7] of scan [63] of the extracted data is a logical "1". The result of the determination, or simply a value from the extracted data, is supplied to control circuit 614.

Key memory 602 supplies reference key data to key insertion circuit 1106 and to control circuit 614. Key insertion circuit 1106 inserts or otherwise writes key data into the reproduced digital data at the location indicated by the position information supplied by VLD parser 1102. For example, key data may be written into QF[7] [7] of scan [63] of a particular block. Optionally, key insertion circuit 1106 may insert or otherwise write key data into decoded extracted data, variable-length encode such data, and incorporate such data into the reproduced digital data. Key insertion circuit 1106 supplies the modified digital data to recording apparatus 608.

Control circuit 614, recording apparatus 608, and display apparatus 616 operate in a manner corresponding to that previously described in connection with formatter 600. In this manner, key data is incorporated into data areas defined for the storage of original source information, e.g. video signals, audio signals, text data, or the like. The incorporation of key data into such data areas hinders efforts to detect, remove, or modify such data.

Each of the embodiments described hereinabove is compatible with an MPEG video standard. Also, by incorporating a key data insertion device in the formatter, each embodiment achieves a greater security function as compared to devices which may insert security data during the data encoding process, e.g. production of a master recording. Further, since formatting devices tend to be more expensive and, therefore, less prevalent than encoding devices, enforcement of data duplication rights at the formatting stage of production, through implementation of the present invention, rather than at the encoding stage of production, is more likely to be successful.

Although illustrative embodiments of the present invention and modifications thereof have been described in detail herein, it is to be understood that this invention is not limited to these precise embodiments and modifications, and that other modifications and variations may be affected therein by one skilled in the art without departing from the scope and spirit of the invention as defined by the appended claims.

What is claimed is:

1. A formatting apparatus for the authentication and mass duplication of an information signal recorded on a storage medium, said apparatus comprising:

first receiving means for receiving said information signal;

second receiving means for receiving a key signal;

key signal detection means, coupled to said first receiving means and to said second receiving means, for analyzing said information signal to detect whether or not a copy of said key signal is present in said information signal;

key insertion means, coupled to said first receiving means and to said second receiving means, responsive to the detection by said key signal detection means that a copy of said key signal is not present in said information signal for selectively inserting into a portion of said information signal not normally allocated for copy protection information a copy of said key signal to produce a modified information signal;

recording means, coupled to said key signal detection means and to said key insertion means, for recording said modified information signal if a copy of said key signal is not detected in said information signal; and means for inhibiting the recording of said information signal if a copy of said key signal is detected in said information signal.

2. Apparatus according to claim 1, wherein said first receiving means receives said information signal from one of a legal master recording and a retail recording.

3. Apparatus according to claim 1, wherein said second receiving means comprises key memory means for storing said key signal.

4. Apparatus according to claim 1, wherein said second receiving means comprises key signal generating means for generating said key signal.

5. Apparatus according to claim 1, wherein said key signal detection means reads and decodes said information signal.

6. Apparatus according to claim 1, wherein said key signal detection means comprises processing means for processing said information signal.

7. Apparatus according to claim 1, wherein said key signal detection means comprises extraction means for extracting a portion of said information signal.

8. Apparatus according to claim 1, wherein said key insertion means inserts a copy of said key signal into a fixed length code in said information signal.

9. Apparatus according to claim 1, wherein said key insertion means inserts a copy of said key signal into an area defined for a user data in said information signal.

10. Apparatus according to claim 1, wherein said key insertion means inserts a copy of said key signal into an area defined for a time code data in said information signal.

11. Apparatus according to claim 1, wherein said key. insertion means inserts a copy of said key signal into an area defined for a SQUANT data in said information signal.

12. Apparatus according to claim 1, wherein said key insertion means inserts a copy of said key signal into an area in said information signal defined for a data representing a high frequency component of a video signal.

13. Apparatus according to claim 1, wherein said key insertion means inserts a copy of said key signal into a QF[7] [7] data area in said information signal.

14. Apparatus according to claim 1, wherein said recording means comprises means for recording a stamper.

15. Apparatus according to claim 1, wherein said recording means comprises means for mass producing a plurality of optical discs.

16. A method for the authentication and mass duplication of an information signal recorded on a storage medium, said method comprising the steps of:

receiving said information signal;

receiving a key signal;

analyzing said information signal to detect whether or not a copy of said key signal is present in said information signal;

if a copy of said key signal is not present in said information signal, selectively inserting into a portion of said information signal not normally allocated for copy protection information a copy of said key signal to produce a modified information signal and recording said modified information signal; and if a copy of said key signal is present in said information signal inhibiting the recording of said information signal.

17. Method according to claim 16, wherein said step of receiving said information signal comprises the step of receiving said information signal from one of a legal master recording and a retail recording.

18. Method according to claim 16, wherein said step of receiving a key signal comprises the step of retrieving said key signal from a key memory.

19. Method according to claim 16, wherein said step of receiving a key signal comprises the step of generating said key signal.

20. Method according to claim 16, wherein said step of analyzing comprises the steps of:

reading said information signal; and decoding said information signal.

21. Method according to claim 16, wherein said step of analyzing comprises the step of processing said information signal.

22. Method according to claim 16, wherein said step of analyzing comprises the step of extracting a portion of said information signal.

23. Method according to claim 16, wherein said step of inserting comprises the step of inserting a copy of said key signal into a fixed length code in said information signal.

24. Method according to claim 16, wherein of said step of inserting comprises the step of inserting a copy of said key signal into an area defined for a user data in said information signal.

25. Method according to claim 16, wherein said step of inserting comprises the step of inserting a copy of said key signal into an area defined for a time code data in said information signal.

26. Method according to claim 16, wherein said step of inserting comprises the step of inserting a copy of said key signal into an area defined for a SQUANT data in said information signal.

27. Method according to claim 16, wherein said step of inserting comprises the step of inserting a copy of said key signal into an area in said information signal defined for a data representing a high frequency component of a video signal.

28. Method according to claim 16, wherein said step of inserting comprises the step of inserting a copy of said key signal into a QF[7] [7] data area in said information signal.

29. Method according to claim 16, wherein said step of recording comprises the step of recording a stamper.

30. Method according to claim 16, wherein said step of recording comprises the step of mass producing a plurality of optical discs.

* * * * *